UNITED STATES PATENT OFFICE.

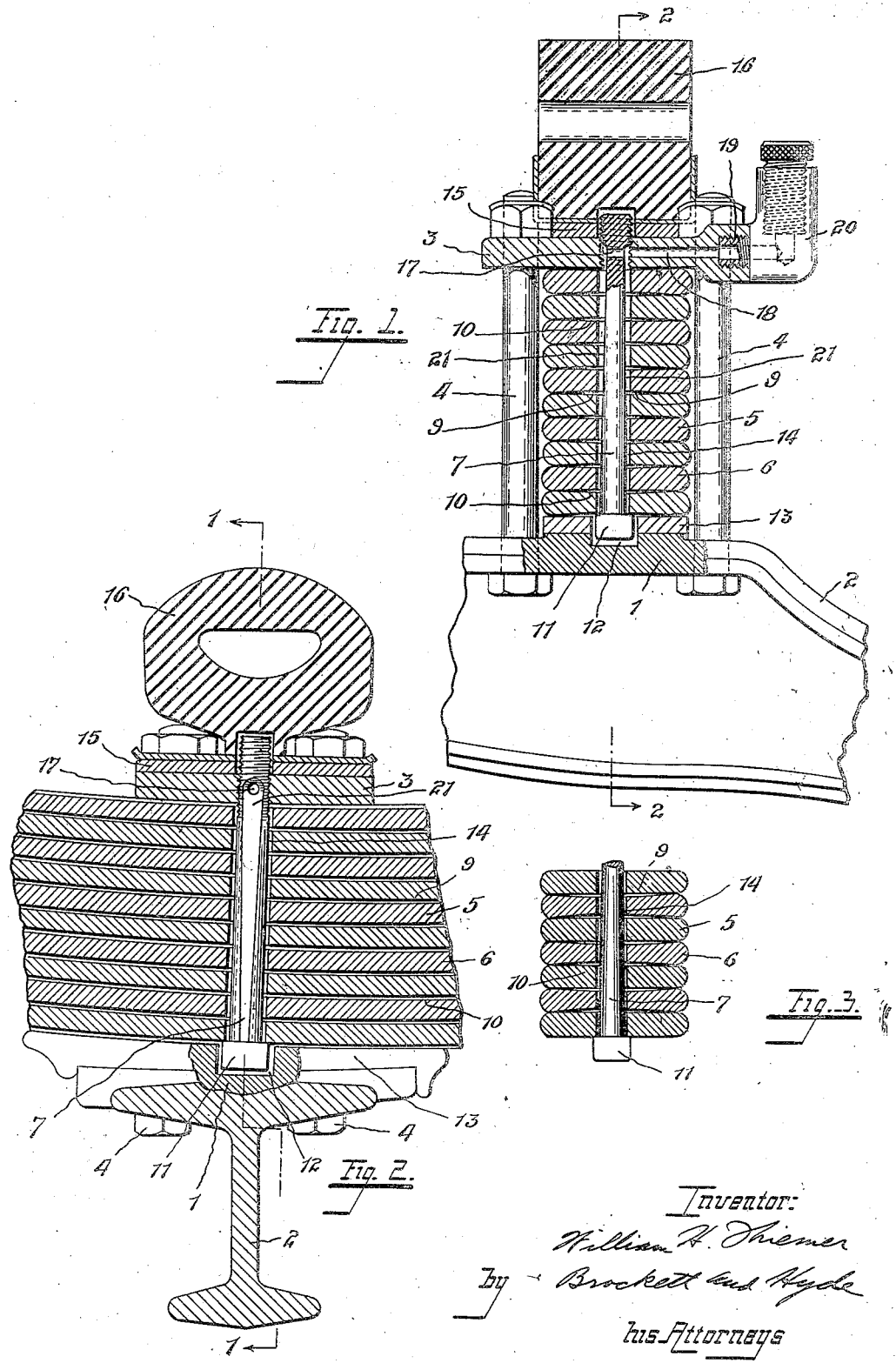

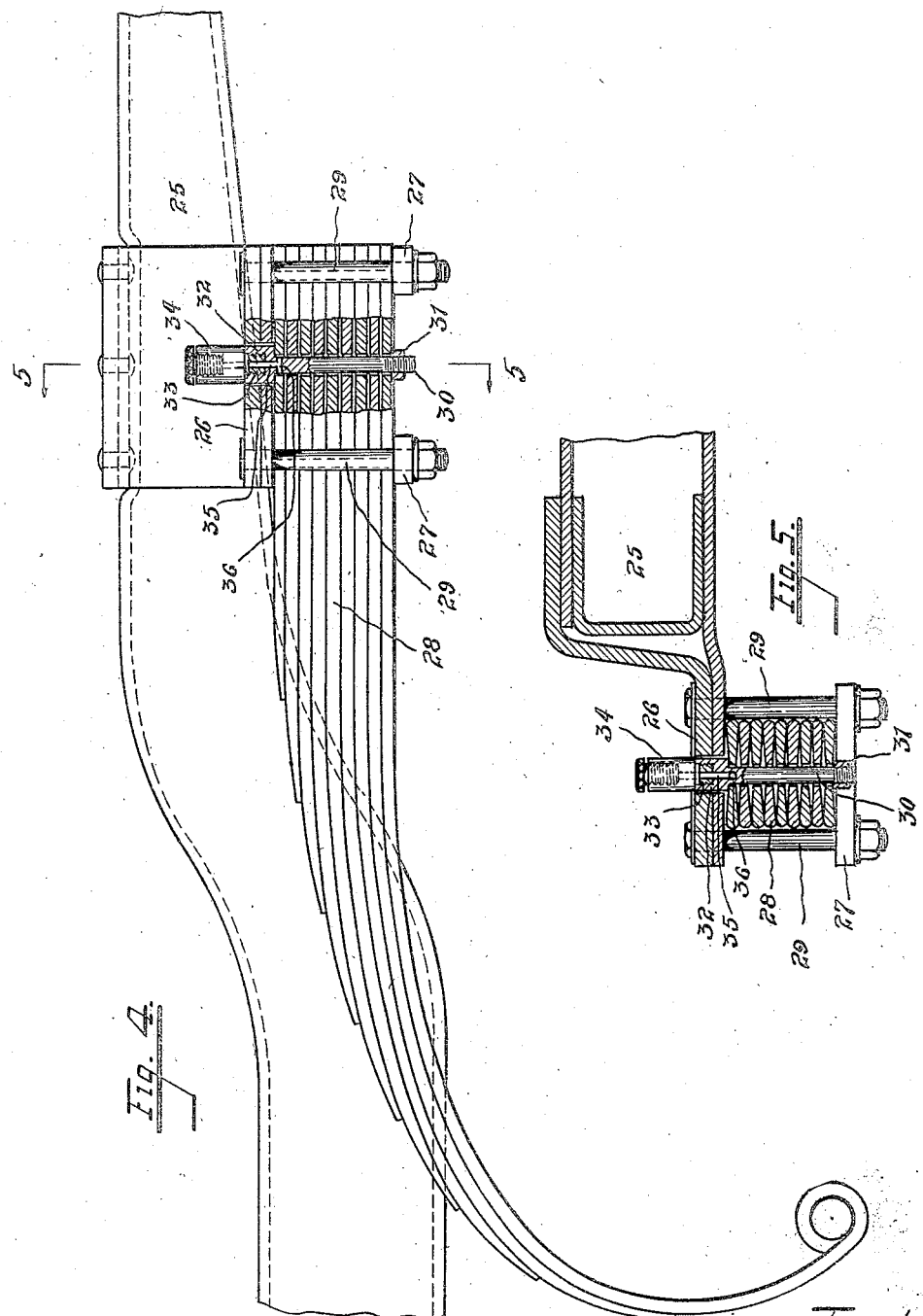

WILLIAM H. THIEMER, OF CLEVELAND, OHIO, ASSIGNOR TO THE WINTON COMPANY, OF CLEVELAND, OHIO, A CORPORATION OF OHIO.

VEHICLE-SPRING LUBRICATOR.

1,307,464.            Specification of Letters Patent.      Patented June 24, 1919.

Original application filed August 5, 1916, Serial No. 113,318. Divided and this application filed August 5, 1916. Serial No. 113,319.

*To all whom it may concern:*

Be it known that I, WILLIAM H. THIEMER, citizen of the United States, residing at Cleveland, in the county of Cuyahoga and State of Ohio, have invented certain new and useful Improvements in Vehicle-Spring Lubricators, of which the following is a specification.

This invention relates to vehicle springs and more particularly to lubricators therefor.

The object of the invention is to provide simple and improved means for conducting lubricant to and distributing it between the leaves of the spring. A further object of the invention is to provide lubricating means for a multiple leaf spring having the usual holding bolt for securing the leaves in nested relation, wherein the lubricant is conducted to channels through and around said bolt and distributed therefrom between the spring leaves, whereby the lubricating means is not disturbed if the spring is removed from its seat and the spring may be lubricated *in situ*. Further objects of the invention are in part obvious and in part will appear more in detail hereinafter.

In the drawings, Figure 1 is a sectional elevation on the line 1—1, Fig. 2, showing one form of spring embodying the invention; Fig. 2 is a cross section on the line 2—2, Fig. 1; Fig. 3 is a detail cross section showing a modification; Fig. 4 is a side elevation, partly in section, of another form of spring embodying the invention; and Fig. 5 is a cross section on the line 5—5, Fig. 4, looking in the direction of the arrows.

Referring to the drawings, 1 indicates the base of the spring seat which is attached to the chassis member 2, while its cap 3 is a separate plate bolted thereto by the shackle bolts 4, which clamp the spring 5 in place. The spring leaves 6 are held in assembled relation by a bolt 7, so that the spring can be removed as a unit from its seat, and said spring is secured in its seat by the shackle bolts 4 extending from cap to base of the seat.

The spring leaves are provided with horizontal slightly concave faces, so as to form shallow chambers 9 extending longitudinally between the meeting faces of adjacent leaves and substantially from edge to edge thereof. These chambers may be provided in several ways, for example, by forming either the upper or lower, or both faces, of each leaf with a shallow concavity 10, as is Fig. 1, or, if desired, alternate leaves may be provided with flat parallel upper and lower faces and concave upper and lower faces, as in Fig. 3. Any of these arrangements provides a longitudinal chamber between each two adjacent leaves and extending substantially from edge to edge thereof. The shallow concavities are formed in the spring leaves at the time of rolling the same and their gradually varying contour in cross section makes them easy to construct and does not impair their strength or interfere with the tempering operation, which is the case when a spring leaf is formed with a marked or sharply pronounced groove or channel.

The leaves, of course, are of different lengths and may extend in either or both directions from the securing bolt 7.

The head 11 of the securing bolt is squared and seated in a recess 12 of the base 1 and a flat plate 13 seated thereon. Its shank passes through alined openings 14 in the spring leaves which form a channel establishing communication around the bolt between the several chambers 9, while the bolt head 11 is so formed as to close or seal the opening in the lower leaf and close all possible outlet for escape of lubricant. The upper end of the bolt is screwed into the cap 3 and extends beyond the same into a seat 15 for a rubber buffer or cushion 16. Said bolt is provided with a cross port or passage 17 communicating with a lateral passage 18 extending outwardly through the spring cap 3 and having an opening 19 at one side of the spring into which may be threaded a suitable oil cup 20. The sides of the bolt may be flattened off, as at 21, to convey the oil delivered through the passage 18 and port 17 to the vertical channel formed by the registering openings 14 in the spring leaves, which distribute said oil to the longitudinal chambers 9 between the leaves.

Figs. 4 and 5 show another embodiment of the invention for the upper spring of a three-quarter elliptical rear spring. In this case the body member 25 has secured thereto a spring cap 26 below which are the cross bars 27 of the base. The spring 28 is secured by the shackle bolts 29. The securing bolt 30 passes through registering openings in the spring leaves and has a nut 31 on its lower end which seals the opening in the bottom leaf. The upper portion of the bolt is enlarged to form a head 32 seating on the upper spring leaf and sealing the opening therein, and which head is provided with a threaded opening 33 to receive the oil cup 34. The opening in said head communicates by a longitudinal passage 35 and the cross passage 36 in the bolt with the vertical channel formed by the registering openings in the spring leaves.

In all forms of the invention described the lubricant for the spring may be readily applied by feeding the oil cups, or by squirting the oil directly into the openings in which said oil cups are threaded. The lubricant is conducted to and distributed thoroughly along the longitudinal chambers between the faces of adjacent spring leaves, so that the entire spring is thoroughly lubricated and operates without squeak and also has a longer life.

It is also to be noted that by concaving the faces of the spring leaves they contact with each other only along lines at their edges, which reduces surface contact and produces a more responsive spring with a quicker rebound and increased reaction to distortion.

It will of course be understood that the invention is not limited to the precise forms shown in the drawings, but covers considerable modification and variation in the details of the parts within the scope of the claims appended hereto.

This application is a division of my copending application for vehicle spring lubricator filed of even date herewith, Serial No. 113,318.

What I claim is:—

1. A vehicle spring, having a plurality of superposed leaves, the thickness of some leaves gradually decreasing from their opposite side edges toward their middle portion whereby successive leaves bear upon each other only at their edges and thereby providing a shallow chamber between each two leaves, said leaves being also provided with registering openings at their middle portions forming a vertical lubricating channel, and a seat for said spring having a cap lying above and a base lying below the same, said cap having a lateral passage communicating with said channel and opening outwardly at the side of the spring.

2. A vehicle spring, having a plurality of superposed leaves, the thickness of some leaves gradually decreasing from their opposite side edges toward their middle portion whereby successive leaves bear upon each other only at their edges and thereby providing a shallow chamber between each two leaves, said leaves being also provided with registering openings at their middle portions forming a vertical lubricating channel, a holding bolt passing through said channel and provided with a transverse passage therethrough, and means for supplying oil to said transverse passage.

3. A vehicle spring, having a plurality of superposed leaves, the thickness of some leaves gradually decreasing from their opposite side edges toward their middle portion whereby successive leaves bear upon each other only at their edges and thereby providing a shallow chamber between each two leaves, said leaves being also provided with registering openings at their middle portions forming a vertical lubricating channel, a holding bolt passing through said channel and provided near its upper end with a transverse passage therethrough, the shank of said bolt having opposite flat faces tapering from its lower end toward its upper end to gradually restrict said vertical lubricating channel downwardly, and means for supplying lubricant to said transverse passage.

In testimony whereof I affix my signature.

WILLIAM H. THIEMER.